United States Patent [19]
Hawley

[11] 3,843,825

[45] Oct. 22, 1972

[54] METHOD OF FORMING A PACKAGED EGG PRODUCT

[75] Inventor: Robert Lyle Hawley, Webster Groves, Mo.

[73] Assignee: Ralston Purina Company, St. Louis, Mo.

[22] Filed: July 23, 1971

[21] Appl. No.: 165,575

Related U.S. Application Data

[63] Continuation-in-part of Ser. No. 848,163, Aug. 7, 1969, abandoned.

[52] U.S. Cl.............. 426/393, 426/115, 426/119, 426/394, 426/407, 426/512
[51] Int. Cl............................................. B65b 5/04
[58] Field of Search............ 99/113, 171 R, 171 H, 99/171 MP, 171 TC, 171 CP, 177, 353, 359, 440, 87, 88; 249/55, 119, 121, 127

[56] References Cited

UNITED STATES PATENTS

| | | |
|---|---|---|
| 211,859 | 2/1879 | Manley .............................. 99/113 |
| 2,235,964 | 3/1941 | Meyer et al. ..................... 99/171 MP |
| 3,367,490 | 2/1968 | Jensen et al. ........................ 99/161 |
| 3,385,205 | 5/1968 | McCloud .............................. 99/88 |

*Primary Examiner*—Raymond N. Jones
*Attorney, Agent, or Firm*—Veo Peoples, Jr.; Lawrence J. Hurst

[57] ABSTRACT

An egg product resembling a hard boiled egg half is formed by placing liquid albumen in the cavities of a mold which has a shape substantially similar to an egg half. This mold is formed into a package which is utilized for shipping the product. The lid of the package defines another mold having a shape representing the yolk portion which is placed in registry with the first mold such that the albumen assumes a shape substantially similar to a hard boiled egg half having a cavity therein for the yolk. The albumen and the package forming the molds are then subjected to heat for a sufficient period of time to effect the coagulation of the albumen. Thereafter the package may be frozen for shipment.

4 Claims, 4 Drawing Figures

PATENTED OCT 22 1974                                    3,843,825

METHOD OF FORMING A PACKAGED EGG PRODUCT

BACKGROUND OF THE INVENTION

This application is a continuation-in-part of application Ser. No. 848,163 filed Aug. 7, 1969 entitled, "Egg Forming Method and Apparatus," now abandoned.

This invention relates to a method of producing an egg product and more particularly to an economic and simplified method of forming hard boiled egg halves.

In the past, in the production of hard boiled egg halves for use in deviled eggs, it has been necessary to hard boil the eggs, remove the shells, then split the egg in half and remove the yolk to obtain the desired coagulated albumen halves. The majority of these operations were done by hand, which not only made it very expensive to produce a large quantity of egg halves but also required a large number of people to achieve high rates of production.

Further, it has been suggested to utilize a machine having mating die members in order to continuously form the desired coagulated albumen halves. However, the use of such a machine presented difficulties in packaging and distributing the so formed coagulated albumen halves.

Accordingly, the present invention relates to a method of forming and coagulating liquid albumen into a shape resembling a hard boiled egg half wherein the package to be utilized in the shipment and distribution thereof forms the desired mold cavities to substantially eliminate handling of the formed products.

SUMMARY

It is therefore the general object of the present invention to provide a method for economically producing hard boiled egg halves.

Another object of the present invention is to provide means for continuously manufacturing hard boiled egg halves from liquid albumen.

Another object of the present invention is to provide a method for forming and coagulating liquid albumen into a shape resembling a hard boiled egg half simultaneously with the packaging thereof.

Another object of the present invention is to provide a package which forms mating die molds for receiving a coaguable food product, permitting the coagulation thereof and serving as the container for the shipment and distribution of the formed coagulated food product.

Another object of the present invention is to provide a package which forms mating die molds to form the liquid albumen into a shape resembling a hard boiled egg half and permits the coagulation of the albumen in this shape.

Still another object of the present invention is to provide a package of a material which forms the albumen into the desired shape and which allows the albumen to be coagulated and frozen. The package also serves as the container for the shipment and distribution of the fabricated egg halves.

These and other objects and advantages of the present invention will become apparent hereinafter.

Briefly, one aspect of the present invention comprises a method for forming an egg product including placing liquid albumen into a mold cavity having a shape resembling an egg half, said mold cavity being formed in the lower portion of a package, placing the lid on the package, said lid defining another mold having a shape resembling the yolk portion of an egg half and which is in registry with the first named mold whereby the albumen is formed into the shape of a hard boiled egg half, heating the albumen and the package to coagulate the albumen and thereafter freezing the albumen within the package.

Another aspect of the present invention is to provide a package for the manufacture and shipment of fabricated egg halves having a lower portion forming a plurality of cavities having a shape resembling an egg half, a lid portion forming a plurality of protuberances resembling the yolk portion of an egg half which are in registry with the cavities to define a shape substantially similar to a hard boiled egg half, said lid forming a fluid pressure seal with said lower portion about each of said cavities and said lid and lower portion being formed of a material which permits the albumen to be heat coagulated and thereafter frozen.

These and other objects and advantages of the present invention will become more apparent from the description hereinafter.

DESCRIPTION OF THE DRAWINGS

In the drawings which illustrate embodiments of the present invention.

DESCRIPTION OF THE PREFERRED EMBODIMENTS

It should be understood that the subject invention although described in terms of forming an egg product resembling a hard boiled egg half may also be applicable to the preparation of other food stuffs which may be deformed into a desirable shape and thereafter coagulated. Since the preparation of the hard boiled egg half is the preferred embodiment of the present invention, the following description will be in terms of treating liquid albumen, although it is not intended to limit the subject invention to the preparation of an egg product.

Figure 1:
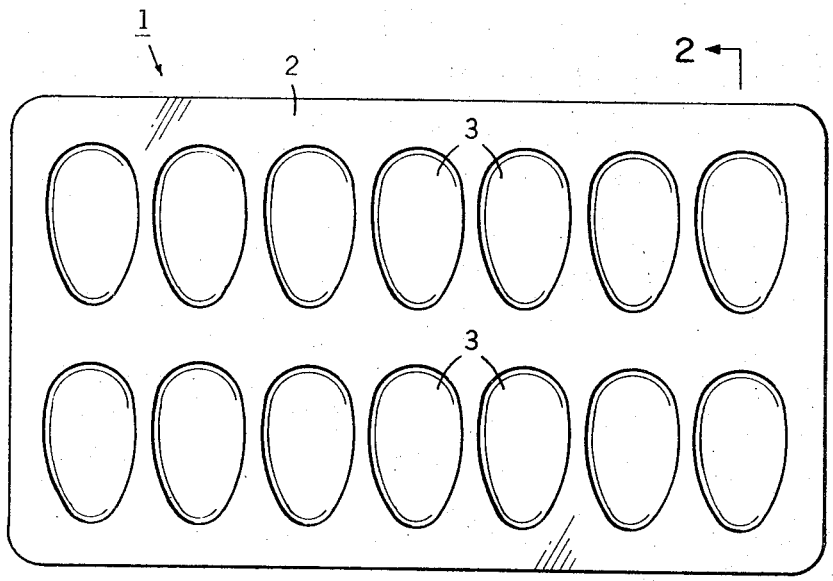
FIG. 1 is a top view of an embodiment of the lower portion of the package member which may be utilized in the present invention.
Figure 2:
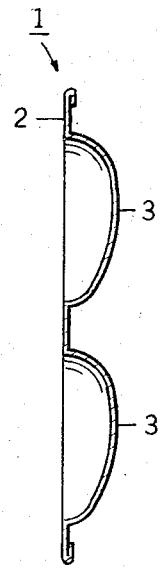
FIG. 2 is a side view of the package construction of FIG. 1.

Referring to the drawings, FIG. 1 shows the lower portion of a package which is to be utilized for continuously producing and packaging the egg product of the present invention. As shown in FIGS. 1 and 2, the lower portion of the egg package indicated generally at 1 consists of a sheet like member 2 which has a plurality of cavities 3 therein. It should be noted that any number of cavities 3 may be provided in the lower package portion 1 and that these cavities may have any shape desired by the operator. Since the preferred embodiment of the present invention is the preparation of a hard boiled egg half, the cavities 3 as shown herein have a shape substantially resembling an egg half. Suitable materials which may be utilized in preparing the lower package portion 1 are aluminum and alloys thereof, plastics either ridged or flexible or other plastic coated metals, such as steel or tin. The package should be of a material which is suitable for the material handling of the product through the preparation of the egg half, storage thereof and shipment to a consumer. In addition, the material utilized should have certain heat transfer characteristics which will be discussed more fully hereinafter. If desired, suitable provisions such as depending ribs may be provided on the lower package portion 1 to facilitate the stacking thereof.

Figure 3:
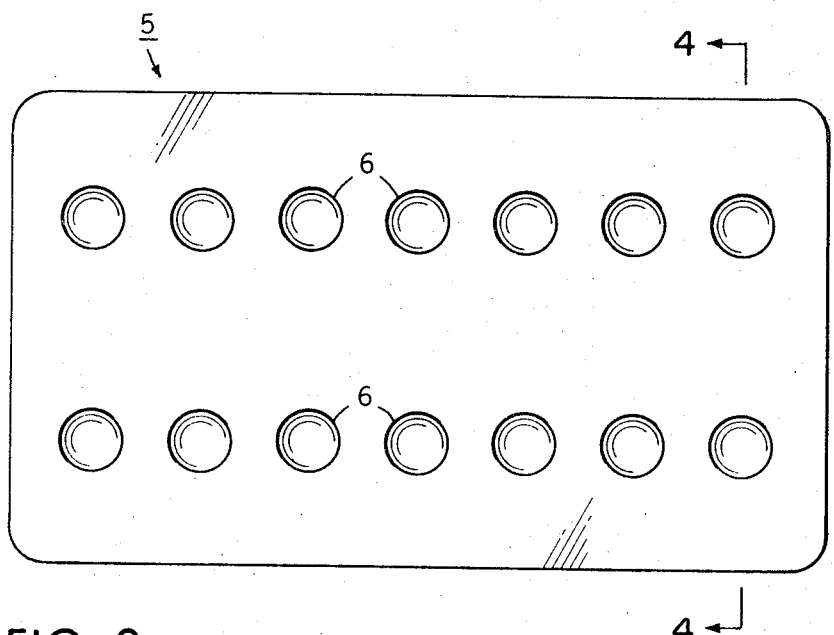
FIG. 3 is a top view of an embodiment of the lid portion of the package of the present invention.
Figure 4:
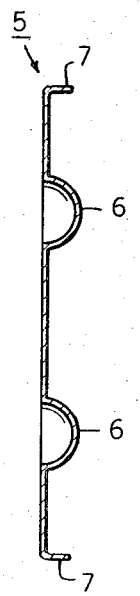
FIG. 4 is a side view of the package construction of FIG. 3.

Referring now to FIGS. 3 and 4, the lid or cover portion, indicated generally at 5, for the lower package portion 1 is provided with a plurality of protuberances 6. These protuberances 6 are so positioned that when the lid 5 is placed on the lower portion 1 of the package the protuberances are aligned or in registry with the cavities 3 so as to form an opening or molding cavity therebetween having a shape which substantially resembles a hard boiled egg half having the yolk portion thereof removed. The lid portion 5 may be provided with flanged members 7 for forming a gripping engagement with the lower portion 1 to prevent the contamination of the product in the package. Alternatively, the lid 5 may be sealed to the lower portion 1 by means of a peripheral seal such as by using glues, pressure welding or pressure or pressure or heat sensitive materials. When the lid 5 is in sealing engagement with the lower portion 1 a fluid pressure seal is established therebetween about the cavities 3. The lid 5 should be constructed of a material which is of substantially the same characteristic as the material utilized in forming the lower package portion 1.

In preparing the egg product of the present invention, the lower package portion 1 has the cavities 3 formed therein and is thereafter placed in a position wherein a predetermined amount of liquid albumen is metered to each of the cavities 3.

Desirably the albumen utilized in the present invention will be treated as described in my Pat. No. 3,510,315 issued May 5, 1970 wherein the coagulated albumen may be frozen and thawed without the occurence of synerisis and the specification thereof is incorporated herein by reference.

The formation of the lower portion 1 having the cavities 3 therein may either be carried out in a separate operation and then fed to the area for metering the albumen into the cavities or may be associated with the metering mechanism, such as by continuously feeding a roll of aluminum stock beneath a press wherein the cavities 3 are formed and thereafter filled with the liquid albumen. Following the metering of the liquid albumen into the cavities 3, the lid 5 is then rolled on to the lower portion 1 so as to align the protuberances 6 with the cavities 3. It is preferable that the lid 5 be rolled onto the lower package portion 1 so as to permit air to escape from between the lid and package member to insure that a proper seal between the lid and lower package portion is obtained about each of the cavities 3. With the lid 5 located on the lower package portion 1, the albumen is displaced or formed into the desired configuration of an egg half having the yolk portion removed. Simultaneously with the lowering of the lid 5 onto the package, the lid is secured or sealed thereon to form a fluid pressure seal therebetween. As previously discussed, this seal may be formed in any manner convenient to the operator and the method or type of material used for forming the seal will be dependent on the type of material used for the package portion 1 and lid portion 5.

It may be desirable to coat the cavities 3 and/or protuberances 6 with a releasing agent such as lecithen or a silicone prior to the contact thereof with the liquid albumen to alleviate or prevent any sticking of the coagulated albumen to the molds during subsequent use.

Following the packaging of the liquid albumen, the package is then subjected to a heated atmosphere having a sufficient temperature and for a sufficient period of time to effect the total coagulation of the albumen in the container. As it will be understood by those skilled in the art, the temperature and time necessary for effecting the coagulation of the albumen will be directly related to the types of material utilized for forming the packaging portions and will also be effected by the size of the egg halves being formed. Typically, it is desirable that a temperature in the range of 170°–210° F. be applied to the package for a period of about 40 – 5 minutes, respectively. In commercial operation it is contemplated that the coagulation of the albumen will be achieved in 5 – 10 minutes. The material selected for the construction of the package should have heat transfer characteristics to permit the coagulation of the albumen without overheating the outer portion of the albumen to deleteriously effect the albumen. This coagulation of the albumen by subjecting the package to a heated atmosphere may be accomplished in any convenient manner such as conveying the packages through a steam atmosphere or through a hot water bath or by placing the packages on racks which will then be heated in a static oven. Other means of heating the albumen to effect the coagulation thereof could also be utilized. Following the coagulation of the albumen the packages are then subjected to a refrigerated atmosphere to freeze the coagulated albumen. The freezing of the coagulated product may be performed in a time period from a few minutes to an hour and desirably in commercial production the temperature utilized and the heat transfer characteristics of the package will permit the coagulated product to be frozen in 10 – 15 minutes. The packages containing the frozen albumen may then be stored for subsequent use by the consumer. In use, the consumer must merely peel off the lid portion 5 to obtain the desired number of egg halves which may thereafter be treated or utilized in the preparation of deviled eggs. As is readily apparent, it is important that the material selected for construction of the package portion 1 and lid 5 should possess heat transfer characteristics which permits the heated and refrigerated atmosphere to which the package is subjected to be effective to coagulate and freeze the albumen without deleteriously effecting the albumen.

It may also be desirable to supply a member containing a deviled mixture or yolk composition which is to be supplied to the cavity formed in the egg white halves by the protuberances 6. This yolk portion may be dispensed in any suitable manner such as the utilization of a chaulking gun or by means of a bag as utilized for decorating bakery products. Typically, such a yolk composition will consist of egg yolks which have been cooked or coagulated and mixed with condiments. Such a yolk composition and the method of preparation thereof is wellknown in the art. The consumer may then remove the lid 5 from the package and supply the yolk composition to the egg halves in the lower portion 1 to prepare the deviled eggs and utilize this package as a serving tray or may remove the egg halves therefrom for subsequent use.

In view of the foregoing, it is obvious that other shapes or configurations could be formed by the molds of the lower package portion 1 and the lid 5 and that other coaguable food materials could be processed in accordance with the present invention. Also, it is now apparent that a novel package and process for preparing and packaging a coaguable food product, meeting the objects set out hereinbefore is provided and that changes or modifications of the package and process set forth in the disclosure by way of illustration may be made by those skilled in the art without departing from the spirit of the invention.

I claim:

1. A method for continuously producing and packaging an egg product which substantially resembles a hard boiled egg half having the yolk portion thereof removed comprising the steps of forming a plurality of cavities in the lower portion of a sheet member, the cavities having a shape substantially resembling an egg half, metering a predetermined amount of liquid albumen into each of said cavities, forming a package by placing a lid member onto the lower portion of the sheet member and in fluid pressure sealing engagement therewith about each of said cavities, said lid member including a plurality of protuberances for registering with said cavities, thereby displacing the liquid albumen with said protuberances to form the liquid albumen into the desired shape of the egg half having the yolk portion removed, heating the package by conveying the package through a steam atmosphere which does not enter the cavities due to the fluid pressure seal formed between the lid and lower portion of the package about each of the cavities; the package being heated to a temperature of approximately 170° – 210°F. and for a period of time about 40 – 5 minutes to coagulate the albumen and thereafter without removing the coagulated albumen from the package freezing the coagulated albumen by subjecting the package to a refrigerated atmosphere.

2. The method according to claim 1 including the step of applying a release reagent to said cavities prior to metering the liquid albumen into said cavities.

3. The method according to claim 2 wherein the release reagent is lecithin.

4. A method for continuously producing and packaging an egg product which substantially resembles a hard boiled egg half having the yolk portion thereof removed comprising the steps of forming a plurality of cavities in the lower portion of a sheet member, the cavities having a shape substantially resembling an egg half, metering a predetermined amount of liquid albumen into each of said cavities, forming a package by placing a lid member onto the lower portion of the sheet member and in fluid pressure sealing engagement therewith about each of said cavities, said lid member including a plurality of protuberances for registering with said cavities, thereby displacing the liquid albumen with said protuberances to form the liquid albumen into the desired shape of the egg half having the yolk portion removed, heating the package by conveying the package through a hot water bath which does not enter the cavities due to the fluid pressure seal formed between the lid and lower portion of the package about each of the cavities; the package being heated to a temperature of approximately 170° – 210°F. and for a period of time about 40 – 5 minutes to coagulate the albumen and thereafter without removing the coagulated albumen from the package freezing the coagulated albumen by subjecting the package to a refrigerated atmosphere.

* * * * *

UNITED STATES PATENT OFFICE
CERTIFICATE OF CORRECTION

Patent No. 3,843,825     Dated Oct. 22, 1974

Inventor(s) Robert Lyle Hawley

It is certified that error appears in the above-identified patent and that said Letters Patent are hereby corrected as shown below:

The date "Oct. 22, 1972" should read "Oct. 22, 1974".

the word "An" should read "an".

Line 4, "into a" should read "in the".

Line 5, a "," should be inserted after the word "product".

"and said package may also be utilized as a serving tray by the consumer." should be inserted before the second word "The".

After the word "lid" insert "or cover".

After the word "package" insert "to be utilized in shipping the product".

Line 14, After the word "shipment" insert "and distribution to the consumer".

Signed and Sealed this twenty-ninth Day of July 1975

[SEAL]

Attest:

RUTH C. MASON
Attesting Officer

C. MARSHALL DANN
Commissioner of Patents and Trademarks